Feb. 29, 1944.  J. A. KING  2,342,868
LIFE SAVING APPARATUS
Filed Jan. 5, 1942
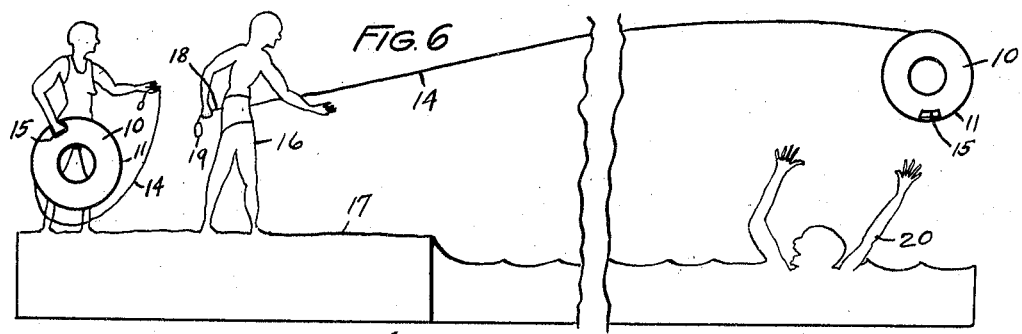
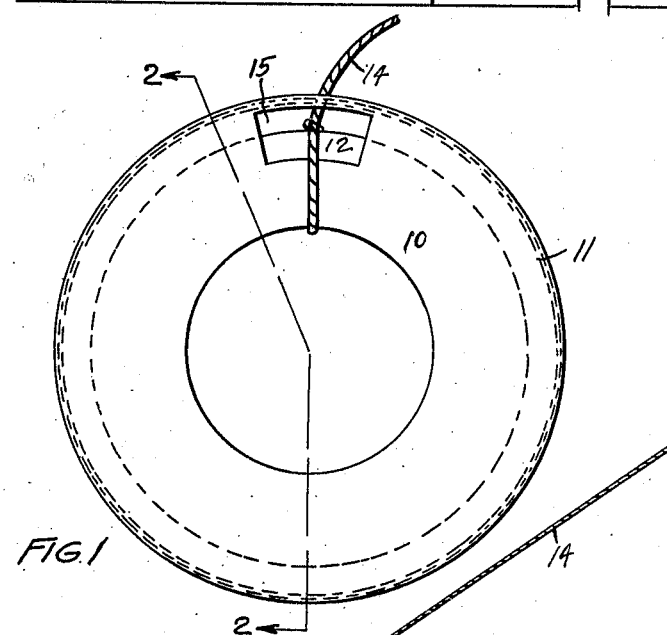
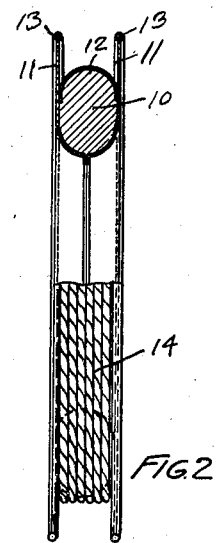
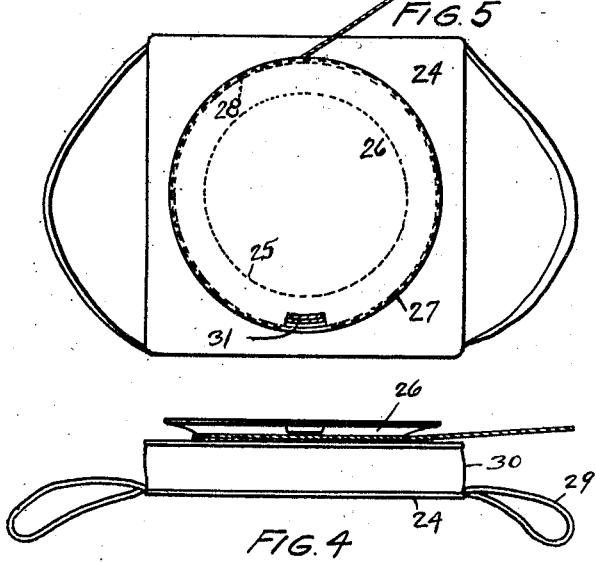
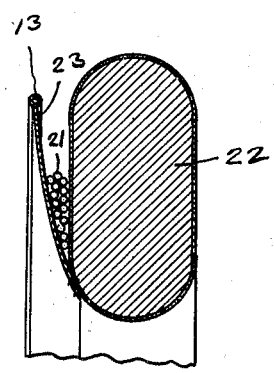
INVENTOR
JAMES A. KING.
BY
ATTORNEY.

Patented Feb. 29, 1944

2,342,868

UNITED STATES PATENT OFFICE 2,342,868

LIFESAVING APPARATUS

James A. King, Portland, Oreg.

Application January 5, 1942, Serial No. 425,619

1 Claim. (Cl. 9—17)

This invention relates generally to life saving apparatus and particularly to devices of the buoyant type combined with means for casting and retrieving the float.

The main object of this invention is to construct a life saving apparatus in the form of a float capable of partially or entirely sustaining the person being rescued, and combining therewith a means for actually propelling the buoyant object to the person in the water and for retrieving it in event the person in the water fails to lay hold of same as well as for actually drawing the person out of the water.

The second object is to provide a convenient non-fouling line storage reel on the float whereby a desired amount of line may be stored for use and be uncoiled automatically as the float approaches the person in the water.

The third object is to provide a line storage device for life preservers and the like which readily adapts itself for use with preservers in the annular form as well as buoyant cushions or other buoyant objects.

These and other objects are accomplished in the manner set forth in the following specification as illustrated in the accompanying drawing, in which:

Fig. 1 is a side elevation of the preferred form of the device.

Fig. 2 is a front elevation of the device with a portion thereof broken away in section along the line 2—2 in Fig. 1.

Fig. 3 is a fragmentary section showing a modified form of the device.

Fig. 4 is a front elevation of a modified form of the device showing same attached to a buoyant cushion.

Fig. 5 is a plan of Fig. 4.

Fig. 6 is an illustrated view showing the manner in which the device is used.

Similar numerals refer to similar parts throughout the several views.

Referring in detail to the drawing, there is shown in Fig. 1, a life preserver 10 of the annular type to which is added a reel element consisting of the fabric sides 11 which may be attached directly to the member 10 or extend within same.

The sides 11 are preferably united by the portion 12. The stiffening rings 13 are bound in the edges of the sides 11. A line 14 is secured to the member 10 by passing it around same through the hand hole opening 15. The line 14 is then wound around the member 10 between the sides 11 as shown in the lower portion of Fig. 2.

The operation of the device is as follows:

The rescuer 16 standing on the shore or dock 17 holds the device by means of the handles formed by the opening 15, and tosses it underhand, giving it a spinning movement which is encouraged by the unwinding of the line 14 itself, whose shore end 18 is preferably attached to a small float 19 for convenience, the object being to place the line 14 within reach of the person 20 in need of assistance.

It follows that if the swimmer is unable to reach the member 10 or grasp the line 14, it can be retrieved by those on the shore and again cast outwardly to the swimmer.

In the form of the device shown in Fig. 3, the line 21 is stored between the buoyant member 22 and the flexible flange 23 which is attached to the member 22 in any convenient manner. This is substantially the same as the form of the device shown in Figs. 1 and 2 except that the line 21 is stored at the side of the member 22 instead of around its greatest diameter.

In the form of the device shown in Figs. 4 and 5, there is illustrated a cushion 24 on one side of which is secured by means of the stitching 25 the circular member 26 whose outer edge 27 is provided with a reinforcement 28. In this form of the device, the cushion may be provided with shoulder straps 29 which are secured to the sides 30 of the cushion, or the member 26 may be provided with a hand hole 31.

Attention is drawn to the fact that the members 11, 23 and 26 may be of fabric, plastic, wood, or any other suitable material, it being desirable to have same resilient in order not to interfere with the use of the member for its purposes, and also that it be buoyant in order not to detract from the buoyancy of the preserver itself.

Attention is also drawn to the reinforcing members 13 and 28, the purpose of which is, as stated, to keep the member taut. While wire can be used, it is preferable to employ rattan, bamboo, or other similar material; in fact anything which would hold the members to circular form would be usable.

While it will be understood that although the float 19 is indicated, it is by no means essential to the successful use of the device, it is desirable for the reason that it assists in the retrieving of the line in case it should go overboard.

In any of the forms of the device as illustrated, it is desirable to propel same in the form shown in Fig. 1—that is, by an underhand cast in which the gyratory action of the float would cause it to maintain a relatively fixed plane as it travels over the water.

While I have thus illustrated and described my invention, it is not my desire to be limited to the details of construction shown herein, but I intend to cover all such forms and modifications as fall fairly within the appended claim:

I claim:

A life preserver consisting of a circular buoyant member having a central opening and somewhat oval cross section, a pair of circular canvas discs provided with means for stretching same taut on opposite sides of said buoyant member, said discs being attached to said buoyant member near the central opening, the outermost portion of said disc extending beyond the outermost portion of said buoyant member, both of said discs having hand openings formed through the canvas thereof through which a hand may be passed outside of the buoyant member.

JAMES A. KING.